(12) United States Patent
Ragan

(10) Patent No.: US 11,235,932 B1
(45) Date of Patent: Feb. 1, 2022

(54) MODULAR ROLLER CONVEYOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/169,645

(22) Filed: Feb. 8, 2021

(51) Int. Cl.
*B65G 13/12* (2006.01)
*B65G 21/14* (2006.01)

(52) U.S. Cl.
CPC ............. *B65G 13/12* (2013.01); *B65G 21/14* (2013.01); *B65G 2207/30* (2013.01)

(58) Field of Classification Search
None
See application file for complete search history.

(56) References Cited

U.S. PATENT DOCUMENTS

| | | | | |
|---|---|---|---|---|
| 2,760,617 A * | 8/1956 | Bowen | ............... | B65G 13/12 193/35 TE |
| 2,938,614 A | 5/1960 | Hewitt, Jr. | | |
| 3,181,676 A * | 5/1965 | Hire | ............... | B65G 13/12 193/35 TE |
| 3,225,879 A * | 12/1965 | Falcon | ............... | B65G 13/12 193/35 TE |
| 3,276,558 A | 10/1966 | Guske et al. | | |
| 4,765,493 A | 8/1988 | Kinney | | |
| 4,830,166 A * | 5/1989 | Ottosson | ............... | B65G 13/12 193/35 F |
| 5,482,422 A | 1/1996 | Hammond | | |
| 5,595,283 A | 1/1997 | Whetsel | | |
| 5,924,551 A * | 7/1999 | Radmall | ............... | B65G 15/14 198/861.1 |
| 6,068,111 A * | 5/2000 | Smith | ............... | B65G 13/12 193/35 TE |
| 10,232,409 B2 * | 3/2019 | Dugat | ............... | B65G 41/002 |
| 10,486,905 B1 * | 11/2019 | Fulton | ............... | B65G 43/02 |
| 10,926,956 B2 * | 2/2021 | Fulton | ............... | B65G 23/44 |

* cited by examiner

*Primary Examiner* — Kavel Singh
(74) *Attorney, Agent, or Firm* — Intellectual Property Consulting, LLC; Stephen M. Kepper

(57) ABSTRACT

A modular roller conveyor comprising a plurality of conveyor modules interconnected by a plurality of links. Each conveyor module comprises an entry end and an exit end, opposing side rails, and a conveying surface coupled to the opposing side rails. The links are operable to rotate the conveyor modules between a stacked configuration and a coplanar configuration. In alternative embodiments, a plurality of modular roller conveyors may be pivotally connected by hinges disposed along the perimeter of the bottom conveyor module. Each conveyor module may include separators at its entry and exit ends and wheels on the bottom conveyor module. Additionally, a system is disclosed that includes a stacking tool operable to transition the modular roller conveyor between the stacked and coplanar configurations.

20 Claims, 9 Drawing Sheets

MODULAR ROLLER CONVEYOR

FIELD

The present invention relates in general to conveyors. More specifically, the present invention relates to multi-purpose conveyors with individual conveyor modules that can be reconfigured to aid in the transportation or storage of items.

BACKGROUND

Conveyors are often used to transport items from one location to another. The items are then typically manually packaged and organized on individual pallets for further storage or transport. Often, the use of a forklift or other machinery is needed to transport pallets within the warehouse or to load the pallets onto existing trucks for transport. These pallets are typically made of wood or some other material that is prone to wear.

The additional required labor, machinery, and steps needed to move product from a conveyor to a pallet, and then to move the individual pallets, is costly and increases the likelihood that product may be damaged or not accounted for during the process. Accordingly, there is a need for a device that automates the loading and unloading of product to remove the step of loading and unloading pallets, improves product throughput, and enhances efficiencies in transporting and storing individual items.

BRIEF SUMMARY OF THE INVENTION

The present invention includes a modular roller conveyor comprising a plurality of conveyor modules interconnected by a plurality of links. Each conveyor module comprises an entry end and an exit end, opposing side rails, and a conveying surface coupled to the opposing side rails. The links are operable to rotate the conveyor modules between a stacked configuration and a coplanar configuration.

In another embodiment, a plurality of individual modular roller conveyors, or towers, are pivotally connected by hinges disposed along a perimeter of the conveyor module at the bottom of each tower.

In yet another embodiment, a modular roller conveyor system is provided. For this embodiment, the individual conveyor modules of any of the aforementioned embodiments further comprises a pusher roller rotatably mounted between the opposing side rails and disposed at the entry end of the conveyor module. The system comprises a stacking tool removably attached to the modular roller conveyor and operable to reposition the conveyor modules between the stacked configuration and the coplanar configuration. The stacking tool comprises a support base with an elevated platform, a main actuator, a bottom actuator, and a lift plate comprising a top segment and a bottom segment, all of which are interconnected using a plurality of hinges. The lift plate is operable to slidably engage the pusher roller of each conveyor module, and the actuators are operable to rotate the modular roller conveyor between the stacked configuration and the coplanar configuration.

For any of the above-mentioned embodiments, each conveyor module may further comprise a pair of separators rotatably mounted at the entry end and exit end of each module; these separators are operable to change between an open and a closed position. Similarly, for any of the above-mentioned embodiments, wheels may be coupled to a bottom surface of the bottom conveyor module.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
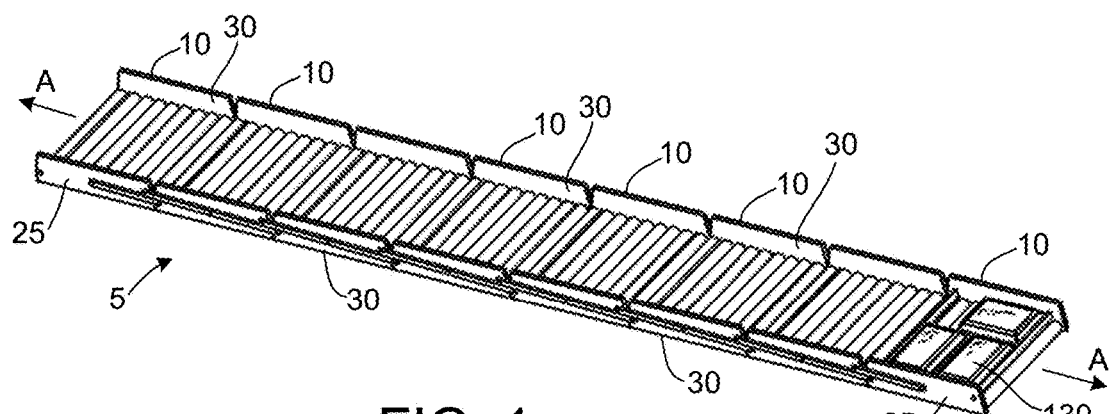
FIG. 1 depicts a side perspective view of a modular roller conveyor in a coplanar configuration.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention. It is contemplated that features of one configuration may be beneficially incorporated in other configurations without further recitation.

DETAILED DESCRIPTION

For a further understanding of the nature and function of the embodiments, reference should be made to the following detailed description. As used herein, "axis" means a real or imaginary straight line about which a three-dimensional body is symmetrical.

Figure 2:
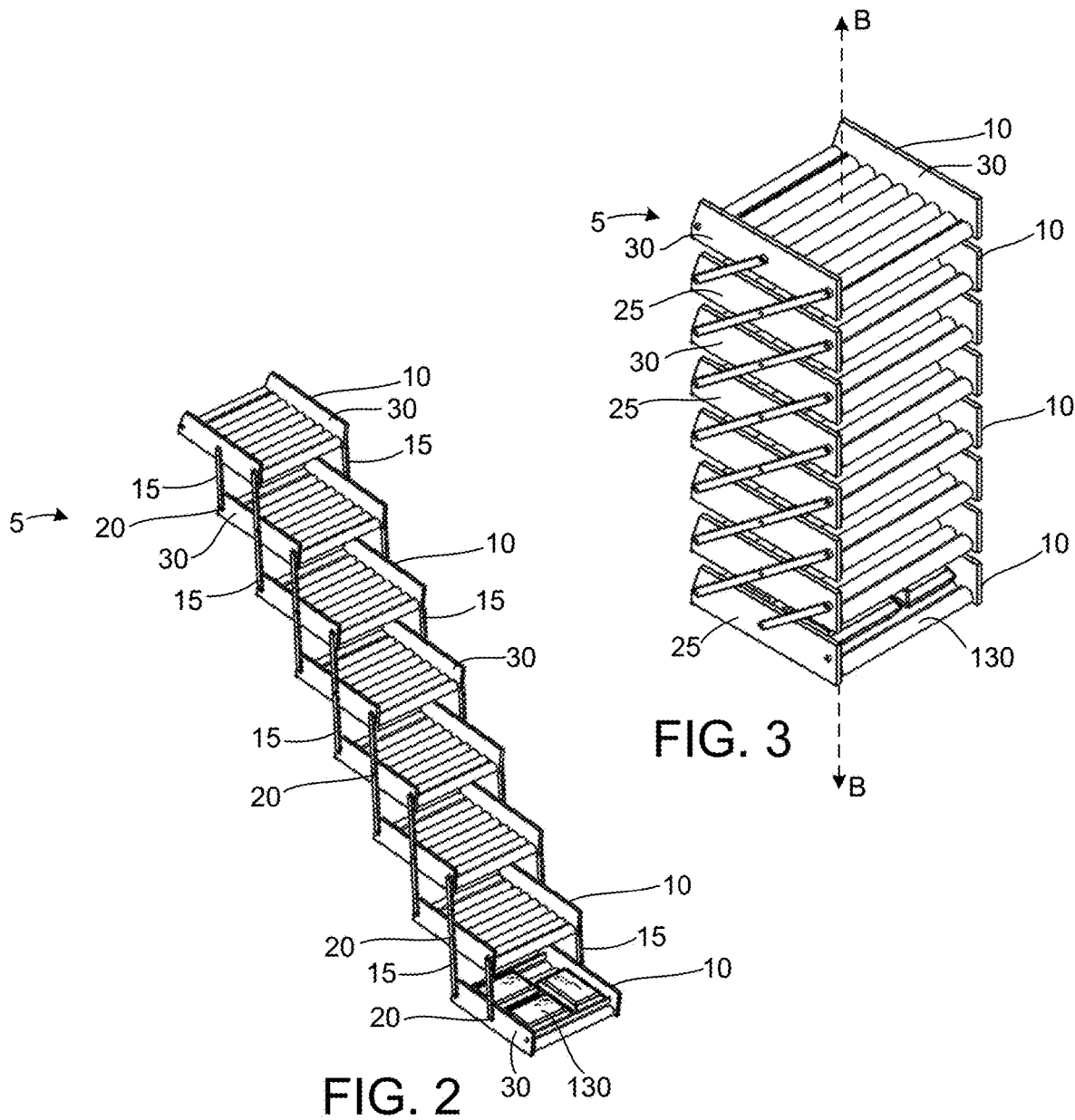
FIG. 2 depicts a side perspective view of a modular roller conveyor in a partially raised configuration.
Figure 3:
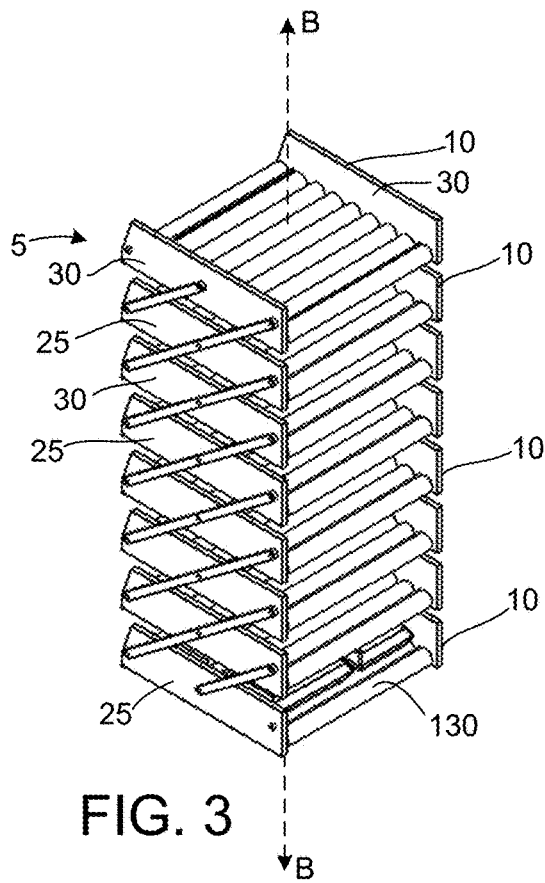
FIG. 3 depicts a side perspective view of a modular roller conveyor in a stacked configuration.

Turning to FIGS. 1-3, alternative, perspective views of the modular roller conveyor 5 in various configurations are shown. The modular roller conveyor 5 comprises a plurality of conveyor modules 10 that are operable to transition from a coplanar configuration to a stacked configuration. FIG. 1 depicts the modular roller conveyor 5 in a coplanar configuration with each individual conveyor module 10 sequentially aligned in a single plane along axis A-A. FIG. 2 shows the modular roller conveyor 5 in a partially raised configuration, and FIG. 3 shows the modular roller conveyor 5 in a stacked configuration with one conveyor module positioned on the bottom and each individual conveyor module 10 arranged along a vertical axis B-B on top of the bottom conveyor module 130 (as shown in detail in FIGS. 9-10).

The individual conveyor modules 10 are connected to each other by a plurality of links 15 in a manner that resembles a planar four-bar linkage system with each conveyor module 10 serving as one of the four links. In the exemplary embodiments shown, each conveyor module 10 has a plurality of attachment points 20 disposed along an exterior surface 25 on the opposing side rails 30. The links 15 are rotatably connected at these attachment points 20 with fasteners that allow the links 15 to freely rotate axially around the fasteners and in relation to the conveyor module 10. For a modular roller conveyor 5 with two conveyor modules 10, two links 15 would be required on each side of the modular roller conveyors 5. For each additional conveyor module 10, an additional link 15 would be required on each side of the modular roller conveyor 5.

FIGS. 4-8 depict exemplary embodiments of an individual conveyor module 10 included within a modular roller conveyor 5. The conveyor module 10 has an entry end 40 and an exit end 50 with opposing side rails 30 and a conveying surface 60 coupled to the side rails and operable to transport items from the entry end 40 to the exit end 50. As shown in the figures, the conveying surface 60 may comprise one or more rollers rotatably mounted between the opposing side rails 30; these rollers may be power rollers or may be actuated manually, by gravity, or externally driven by a separate power source such as a motor. It is further anticipated that other conveying means in place of the rollers may be utilized, including a flat belt conveyor, a magnetic belt conveyor, or a wheel conveyor.

Figure 4:
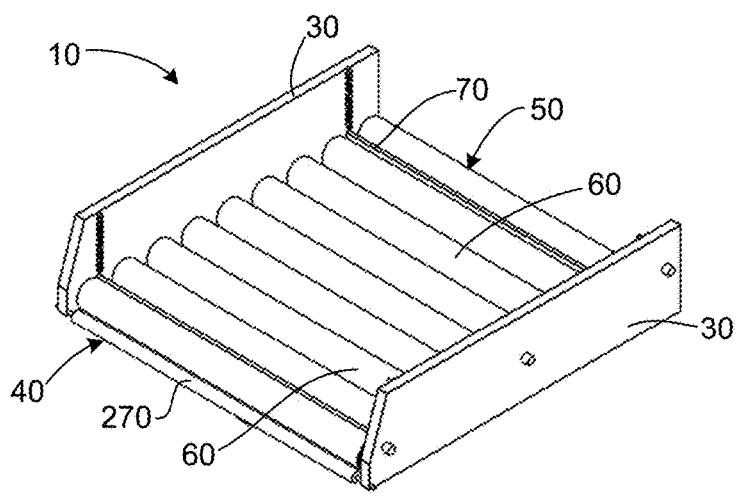
FIG. 4 depicts a perspective view of a conveyor module showing the separators in an open configuration.
Figure 5:
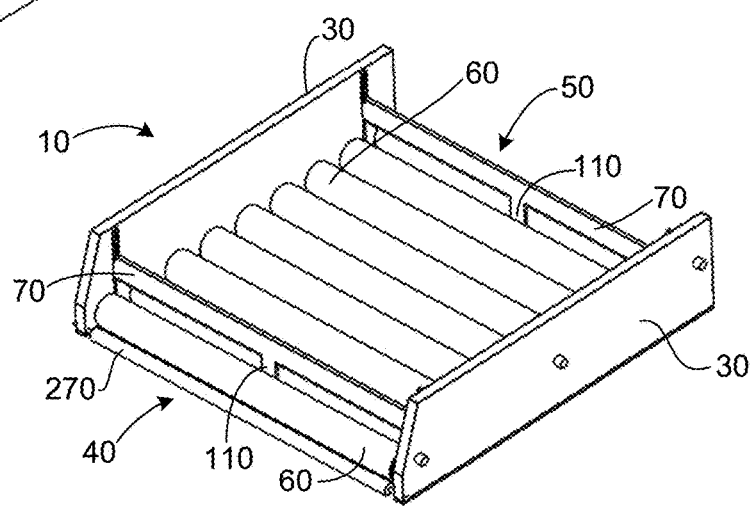
FIG. 5 depicts a perspective view of a conveyor module showing the separators in a closed configuration.
Figure 7:
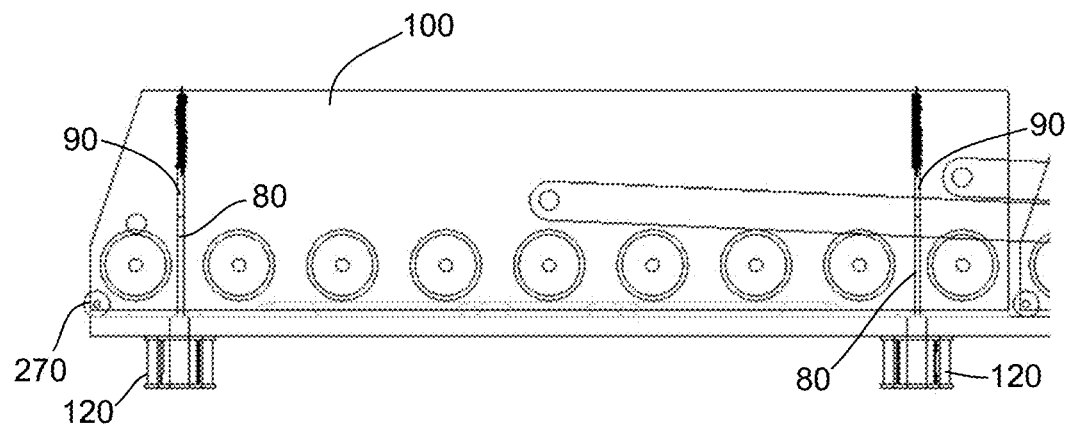
FIG. 7 depicts a cross-sectional view of a conveyor module showing the separators in a closed configuration.
Figure 8:
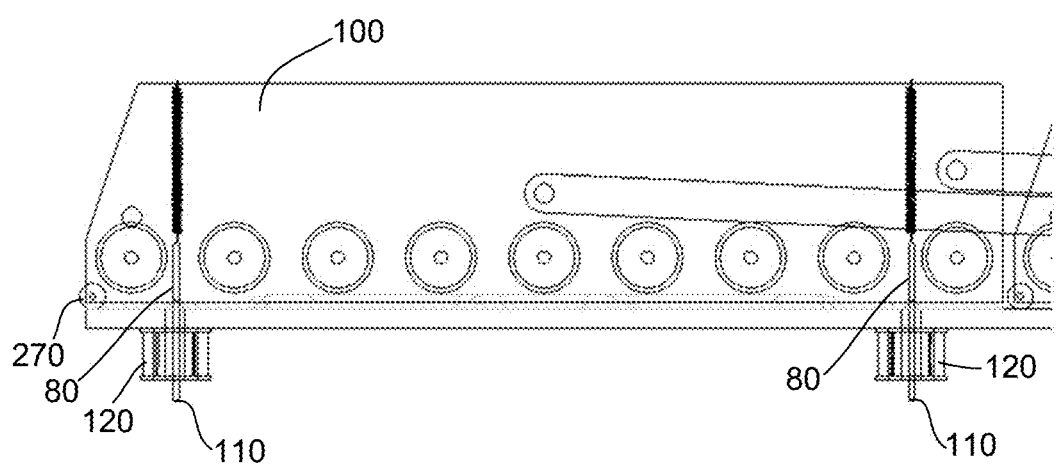
FIG. 8 depicts a cross-sectional view of a conveyor module showing the separators in an open configuration.

In an alternative embodiment, each conveyor module 10 comprises a separator 70 at the entry end 40 and exit end 50 of each individual conveyor module 10. FIG. 4 depicts these separators 70 in an open position where product is allowed to flow freely over the conveying surface 60. FIG. 5 depicts these separators 70 in a closed configuration where the product is confined to the area between the separators 70. These separators 70 allow a user to load a specific quantity of product or food onto each individual conveyor module 10. In an exemplary embodiment, the separators 70 are spring loaded in the closed configuration. Each separator is sized and dimensioned to freely move up and down without obstructing the conveying surface 60, and the ends 80 of each separator 70 are sized and dimensioned to fit within the slots 90 disposed on the interior surface 100 of the side rails 30. Each separator 70 further comprises a strip of magnetic material 110 (e.g., iron) that extends below the conveyor module 10 and is positioned in proximity to a solenoid 120 mounted in the conveyor supporting frame (as shown in FIGS. 7-8) beneath the conveyor module 10. The solenoids 120 are operable to actuate each separator 70, such that the magnetic field created by each solenoid 120 pulls the separator 70 down from a closed position to an open position. It is anticipated that the conveyor module 10 may include other sensors in communication with a control module operable to regulate current supplied to each solenoid 120, such that the separators 70 may be configured to open and close when certain quantities of food or product pass over the separators 70.

Figure 9:
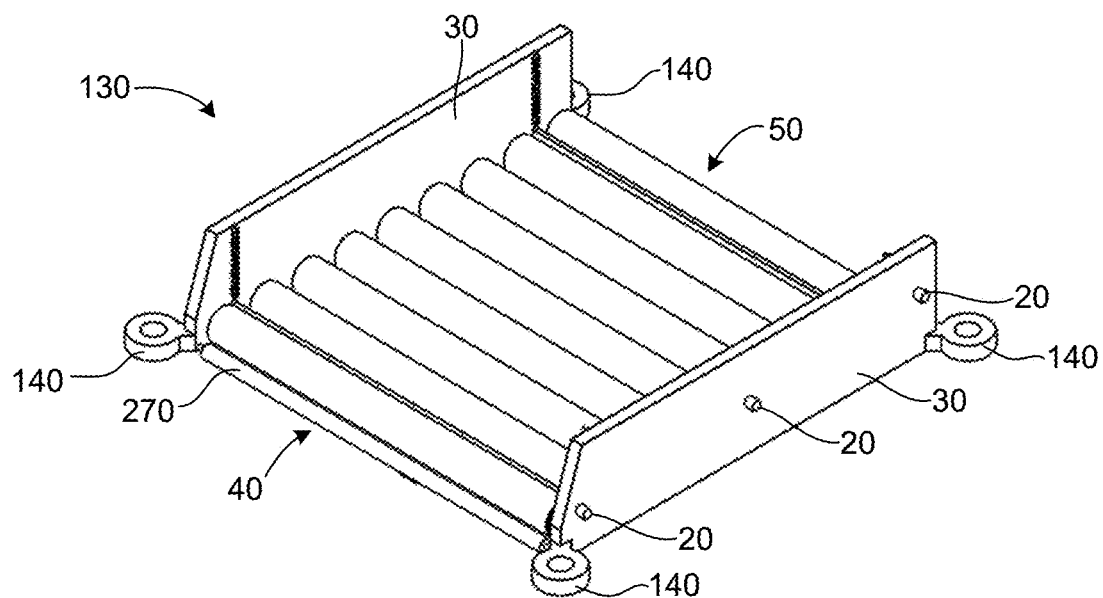
FIG. 9 depicts a top perspective view of a bottom conveyor module.
Figure 10:
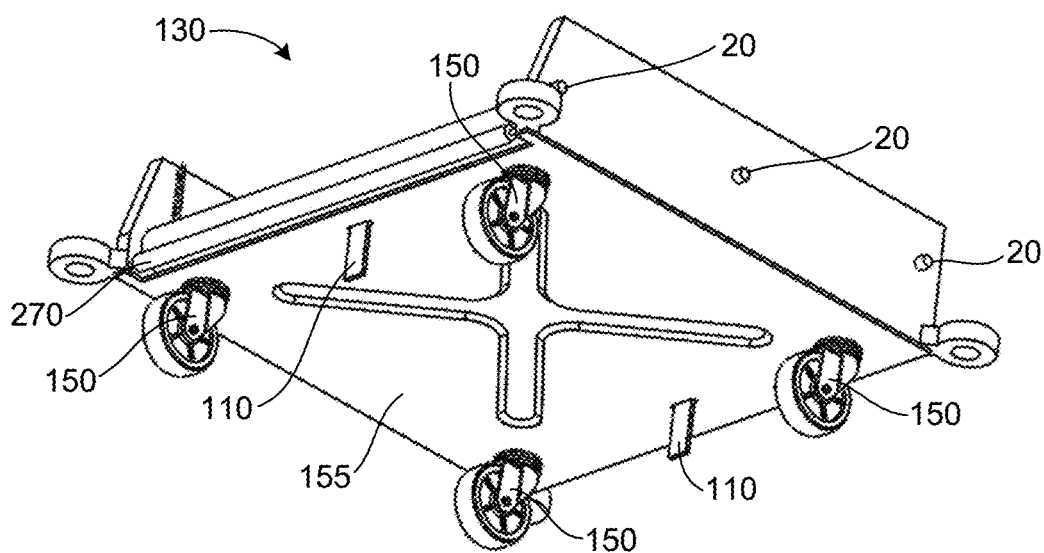
FIG. 10 depicts a bottom perspective view of a bottom conveyor module.

Turning to FIGS. 9-10, an exemplary embodiment of a conveyor module 130 positioned at the bottom of the modular roller conveyor 5 is shown. The bottom conveyor module 130 comprises a plurality of hinges 140 disposed along its perimeter. These hinges 140 may be fixedly attached to the conveyor module 10 by molding, welding, or some other means of attachment, or alternatively, may be removably attached using a fastener, e.g., a snap fitting. In the figures, these hinges 140 are located at each of the four corners of the bottom conveyor module 130 where the side rail 30 intersects the entry end 40 and exit end 50. In alternative embodiments, these hinges 140 may be less in number and positioned elsewhere along the perimeter of the conveyor module 10. As shown in FIG. 10, wheels 150 may be attached to the bottom surface 155 of the bottom conveyor module 130, which allows the modular roller conveyor 5 to be mobile when in the stacked configuration.

Figure 11:
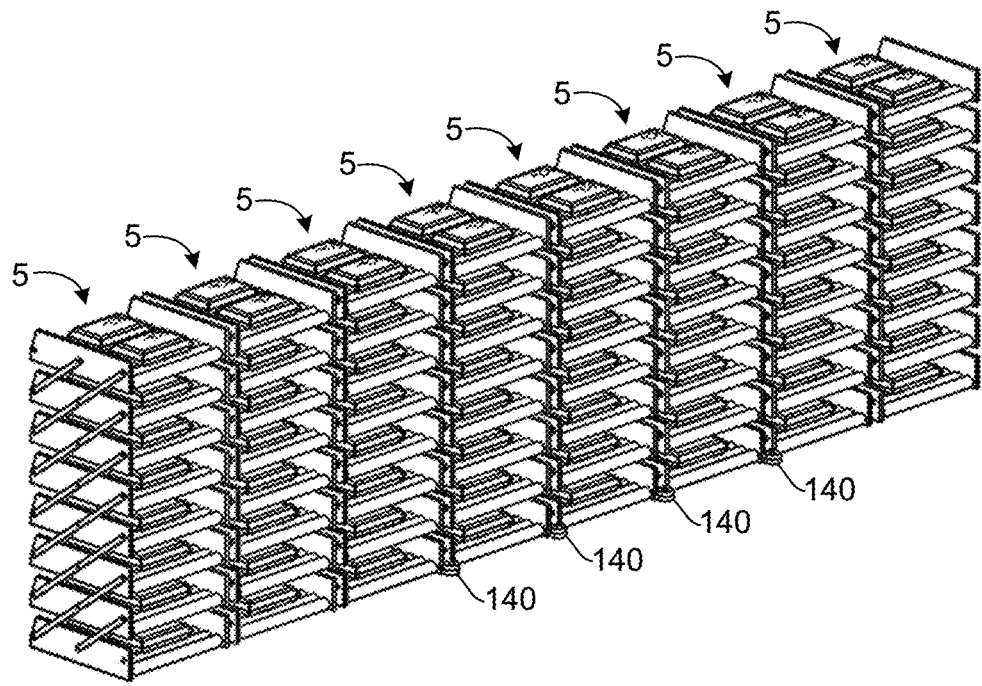
FIG. 11 depicts a side perspective view of a plurality of modular roller conveyors according to an illustrative embodiment of the invention.
Figure 12:
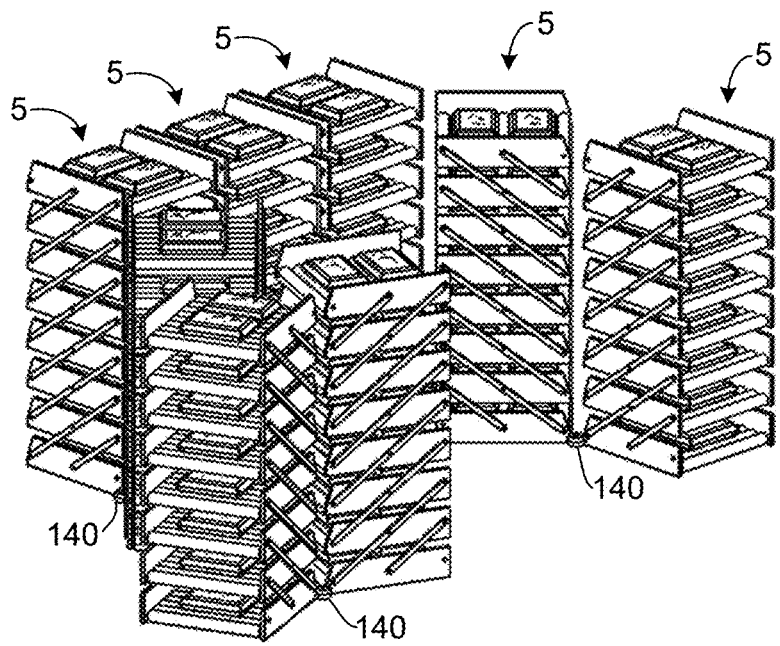
FIG. 12 depicts the modular roller conveyors shown in FIG. 11 in an alternative configuration.
Figure 13:
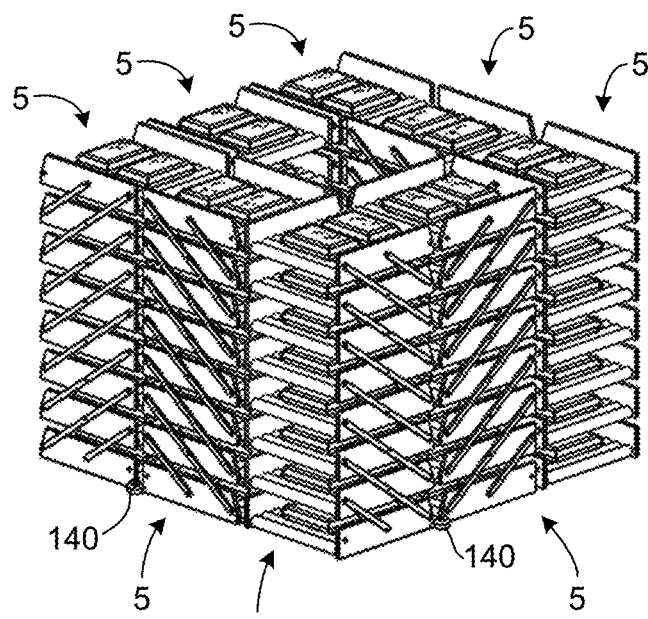
FIG. 13 depicts the modular roller conveyors shown in FIG. 11 in an alternative configuration.

Turing to FIGS. 11-13, various configurations of separate modular roller conveyors 5 are interconnected at the hinges 140 disposed along the perimeter of the bottom conveyor module 130. For purposes of this application, each individual modular roller conveyor 5 in a stacked configuration is also referred to as a "tower." As depicted, the hinges 140 allow each individual tower 5 to be manipulated into a more compact unit for purposes of storage or transport.

Figure 14:
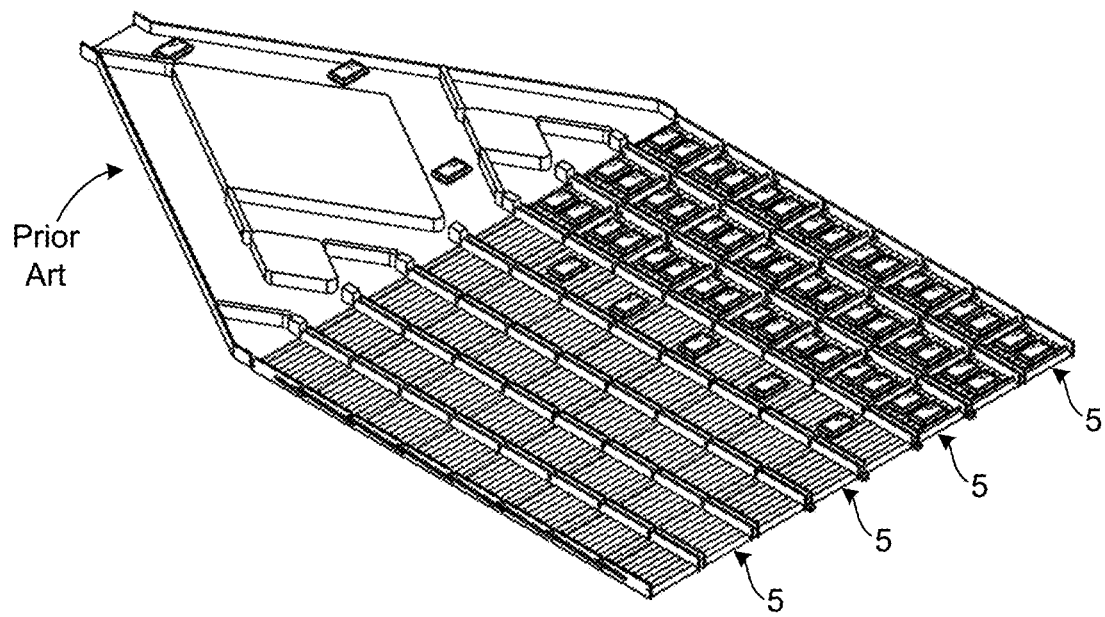
FIG. 14 depicts a plurality of the modular roller conveyors in the coplanar configuration being used with a product infeed system known in the art.
Figure 15:
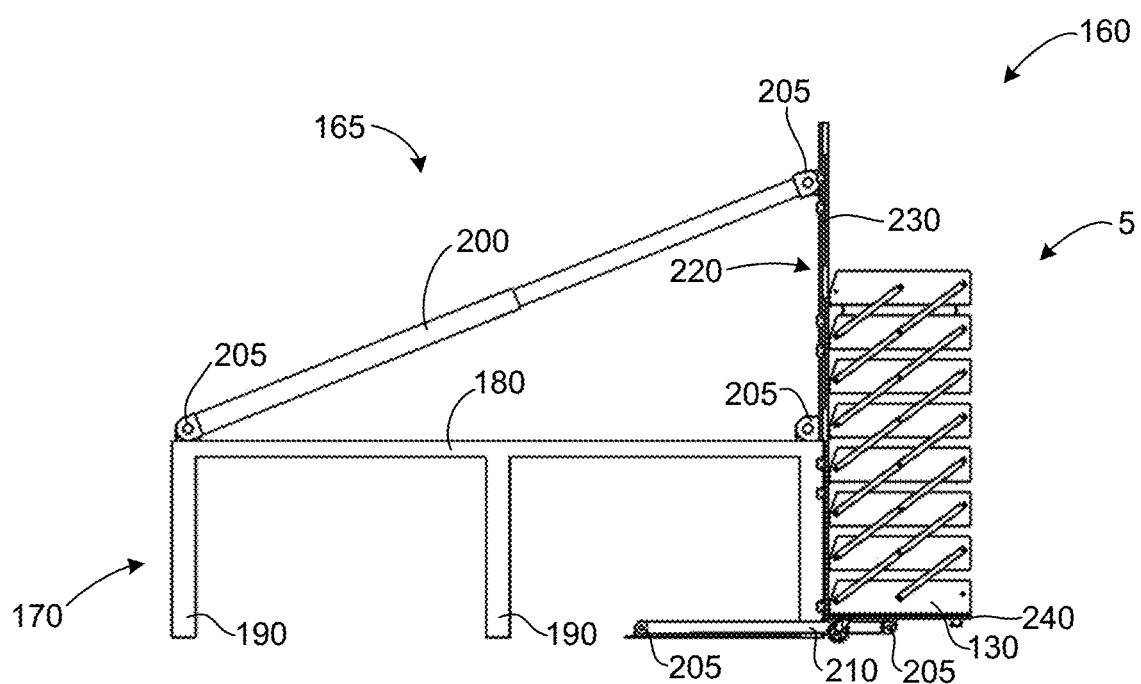
FIG. 15 depicts a side view of the modular roller conveyor system with the modular roller conveyor in a stacked configuration.

In practice, the embodiments of the invention allow for efficient palletization of products using individual modular roller conveyors 5. As shown in FIG. 14, a plurality of gravity fed modular roller conveyors 5, positioned at an angle, tie into a product infeed system that allows product or items to be manually fed onto each individual roller conveyor module 10. After the items are loaded on the individual conveyor modules 10, the individual towers 5 revert to their stackable configuration where the towers 5 are capable of being rearranged or moved to another location depending on the needs of the user.

Figure 6:
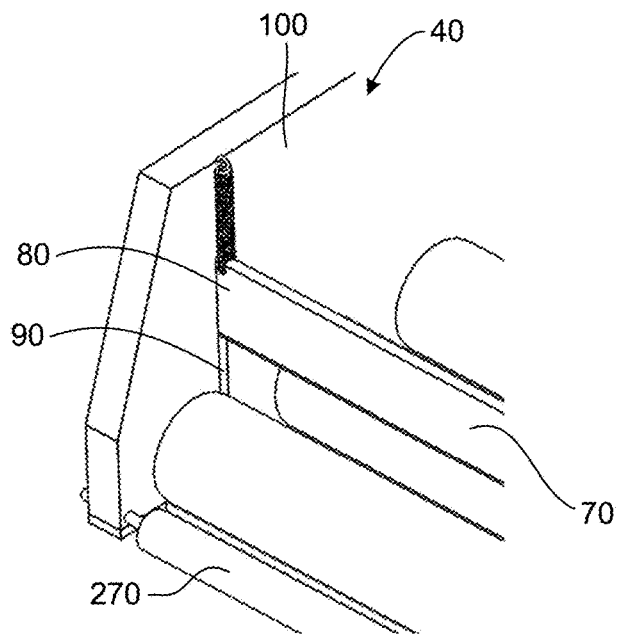
FIG. 6 depicts a focused, perspective view of the separator in a closed configuration.

Turing to FIGS. 15-18, an exemplary modular roller conveyor system 160 is shown that is operable to transition the modular roller conveyor 5 between its coplanar configuration and its stacked configuration. An important aspect of the system is the ability to stabilize the bottom roller conveyor module 130 as the modular roller conveyor 5 transitions between configurations and provide a means for the modular roller conveyor 5 to be at a suitable height for the user while in the coplanar configuration. To do this, the preferred embodiment of the modular roller conveyor system 160 comprises a stacking tool 165 that includes a support base 170 having an elevated platform 180 and support means, which may include one or more support legs 190. The stacking tool 165 further comprises a main actuator 200, a bottom actuator 210, and a lift plate 220 comprising a top segment 230 and a bottom segment 240, which are interconnected using a plurality of hinges 205 or other fasteners that allow the lift plate 220 to rotate about a fixed axis of rotation in relation to the support base 170. The main actuator 200 and bottom actuator 210 may be activated by pneumatic, electric, or hydraulic means. As detailed in FIG. 16, to prevent the bottom roller conveyor module 130 from rotating during transition, a chock 250 operable to prevent rotation is positioned where the top segment 230 meets the bottom segment 240 of the lift plate 220. Additionally, as shown in FIGS. 4-6, each conveyor module 10 has a separate pusher roller 270 rotatably mounted between the opposing side rails 30 and disposed at the entry end 40 of each of the conveyor modules 10. The lift plate 220 engages the pusher roller 270 of each conveyor module 10 in similar fashion to a cam and follower mechanism. The pusher roller 270 provides the anti-friction element that allows the conveyor modules 10 to float while transitioning between configurations.

As the main actuator 200 extends, and the bottom actuator 210 retracts, the lift plate 220 slidably engages the individual pusher rollers 270 of each conveyor module 10 and operates to push the modular roller conveyor 5 into a stacked position. Conversely, when the main actuator 200 retracts, and the bottom actuator 210 extends, the lift plate 220 operates to reposition the modular roller conveyor 5 into a coplanar configuration.

Figure 16:
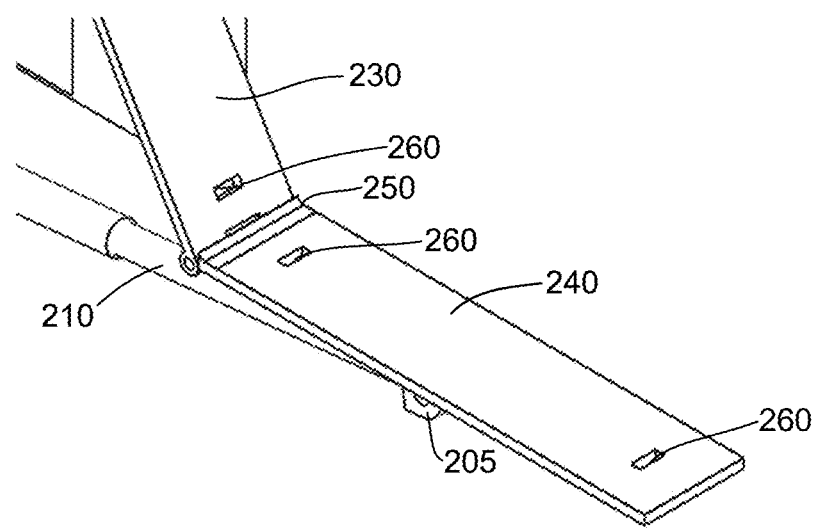
FIG. 16 depicts a focused, perspective top view of the bottom segment of the lift plate of the modular roller conveyor system.
Figure 17:
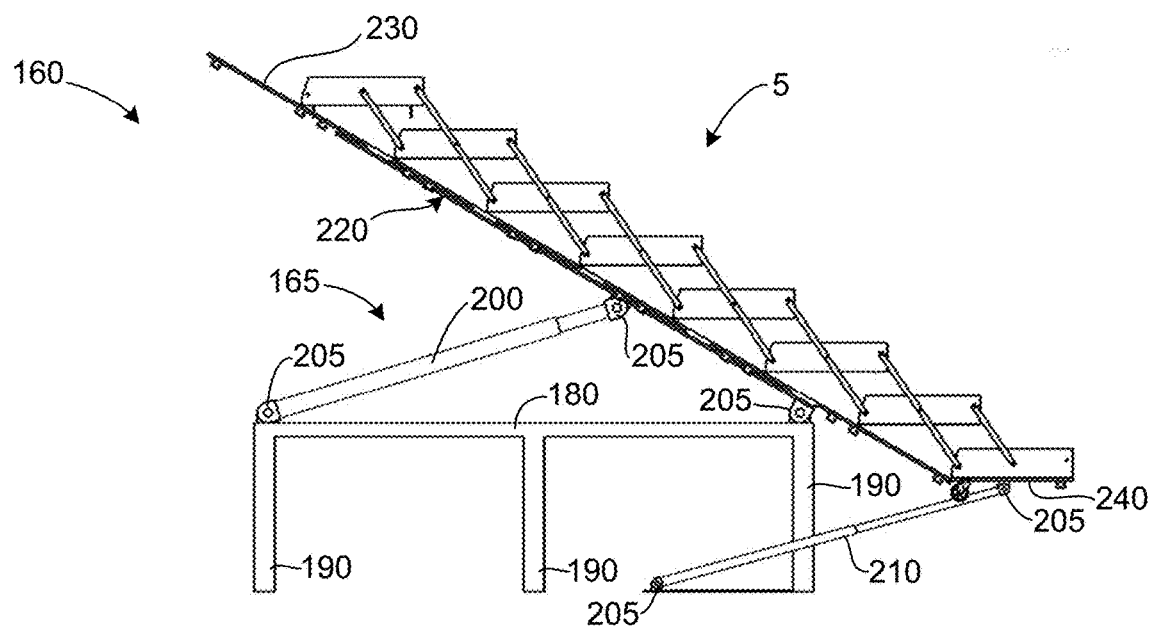
FIG. 17 depicts a side view of the modular roller conveyor system with the modular roller conveyor in a partially raised configuration.
Figure 18:
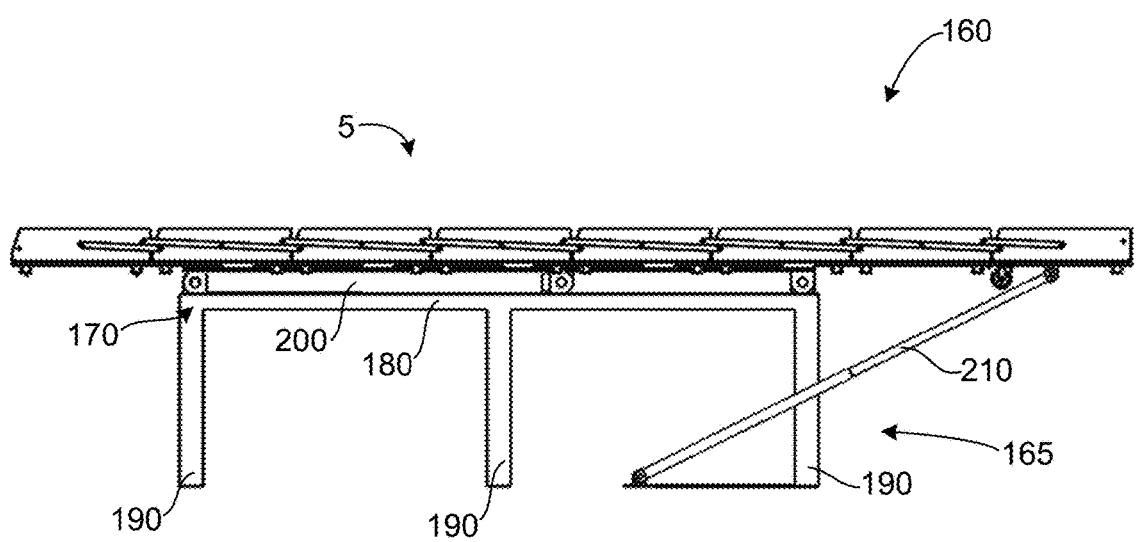
FIG. 18 depicts a side view of the modular roller conveyor system with the modular roller conveyor in a coplanar configuration.

As shown, in FIG. 16, when separators 70 are used for the conveyor modules 10, the lift plate 220 further comprises apertures 260 that are operable to receive the magnetic strip 110 when transitioning to the coplanar configuration.

Figure 19:
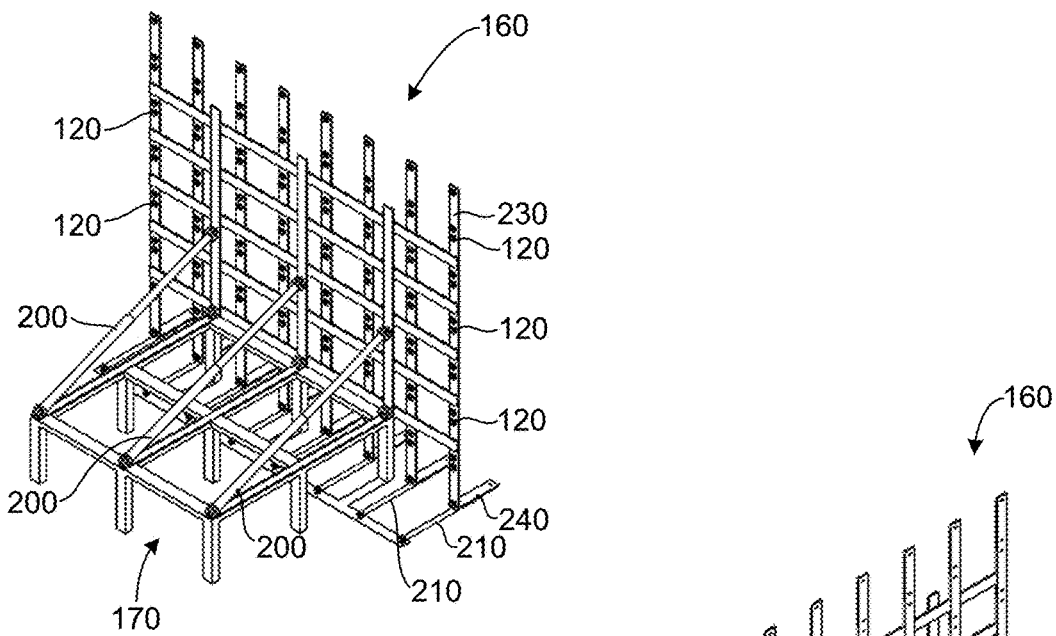
FIG. 19 depicts a back, perspective view of a scaled modular roller conveyor system without the modular roller conveyors.
Figure 20:
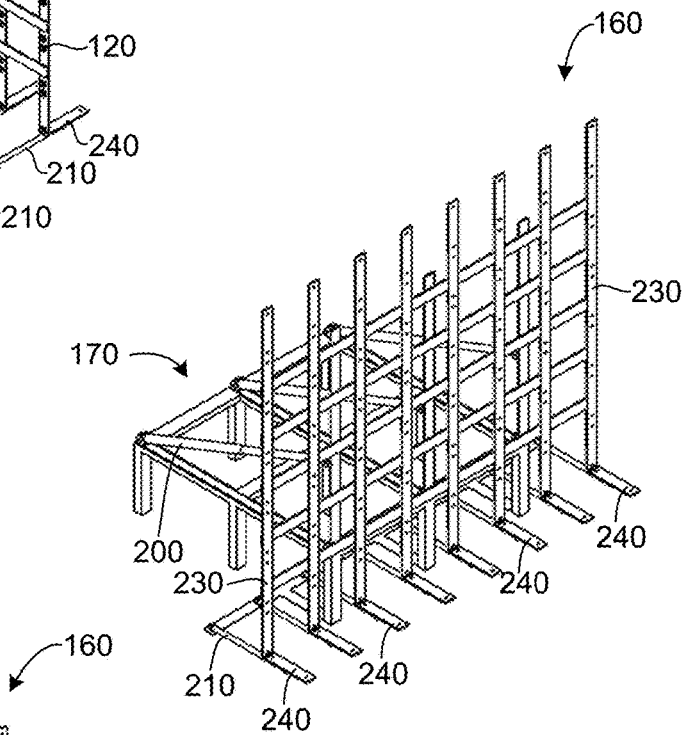
FIG. 20 depicts a front, perspective view of a scaled modular roller conveyor system without the modular roller conveyors.
Figure 21:
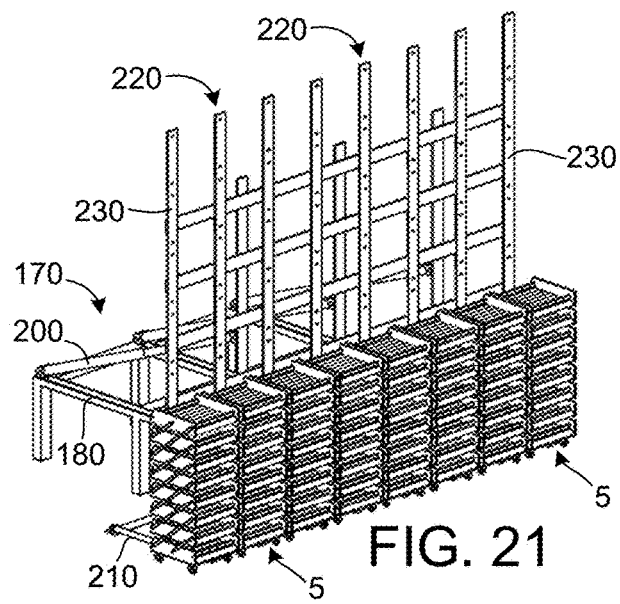
FIG. 21 depicts a front, perspective view of a scaled modular roller conveyor system with the corresponding modular roller conveyors.

Turning to FIGS. 19-21, an exemplary embodiment of a scaled version of the modular roller conveyor system 160 is shown which can support a plurality of modular roller conveyors 5. As depicted, the modular roller conveyor system 160 can be retrofitted and scaled to support a larger quantity of modular roller conveyors 5 to support the needs of the user.

For the purposes of promoting an understanding of the principles of the invention, reference has been made to the embodiments illustrated in the drawings, and specific language has been used to describe these embodiments. However, this specific language intends no limitation of the scope of the invention, and the invention should be construed to encompass all embodiments that would normally occur to one of ordinary skill in the art. The implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A modular roller conveyor comprising:
   a plurality of conveyor modules connected by a plurality of links, each conveyor module comprising an entry end and an exit end, opposing side rails, and a conveying surface coupled to the side rails and operable to transport items from the entry end to the exit end,
   wherein the side rails each have a height that extends a distance above the conveying surface,
   wherein the links are rotatably connected to the side rails of the conveyor modules and operable to transition the conveyor modules between a stacked configuration and a coplanar configuration,
   wherein, in the stacked configuration, one of the conveyor modules is positioned on the bottom and each additional conveyor module is arranged along a vertical axis above the conveyor module on the bottom, and
   wherein, in the coplanar configuration, the conveying surface of each of the conveyor modules is sequentially aligned and continuous along a single plane.

2. The modular roller conveyor of claim 1 wherein the conveying surface is selected from the group comprising: gravity rollers, powered rollers, a flat belt conveyor, a magnetic belt conveyor, and wheel conveyors.

3. The modular roller conveyor of claim 1 comprising a separator at the entry end and the exit end of the conveyor modules, wherein each separator is operable to be in a first open position or a second closed position.

4. The modular roller conveyor of claim 1 comprising a plurality of wheels connected to a bottom surface of the bottom conveyor module.

5. A modular roller conveyor system comprising:
   a plurality of modular roller conveyors, each modular roller conveyor comprising a plurality of conveyor modules connected by a plurality of links, each conveyor module comprising an entry end, an exit end, opposing side rails, and a conveying surface coupled to the side rails and operable to transport items from the entry end to the exit end,
   wherein the links are rotatably connected to the side rail of the conveyor modules and operable to transition the conveyor modules between a stacked configuration and a coplanar configuration,
   wherein, in the stacked configuration, one of the conveyor modules is positioned on the bottom and each additional conveyor module is arranged along a vertical axis above the conveyor module on the bottom, and
   wherein, in the coplanar configuration, the conveying surface of each of the conveyor modules is sequentially aligned and continuous along a single plane,
   a plurality of hinges disposed along a perimeter of the bottom conveyor module,
   wherein the modular roller conveyors, in the stacked configuration, are pivotally connectable at the hinges.

6. The modular roller conveyor system of claim 5 wherein the conveying surface is selected from the group comprising: gravity rollers, powered rollers, a flat belt conveyor, a magnetic belt conveyor, and wheel conveyors.

7. The modular roller conveyor system of claim 5 comprising a separator at the entry end and the exit end of the conveyor modules, wherein each separator is operable to be in a first open position or a second closed position.

8. The modular roller conveyor system of claim 5 comprising a plurality of wheels connected to a bottom surface of the bottom conveyor module.

9. A modular roller conveyor system comprising:
a modular roller conveyor comprising a plurality of conveyor modules connected by a plurality of links, each conveyor module comprising an entry end and an exit end, opposing side rails, a conveying surface coupled to the side rails and operable to transport items from the entry end to the exit end, and a pusher roller rotatably mounted between the opposing side rails and disposed at the entry end of each of the conveyor modules,
wherein the links are rotatably connected to the side rail of the conveyor modules and operable to transition the conveyor modules between a stacked configuration and a coplanar configuration,
wherein, in the stacked configuration, one of the conveyor modules is positioned on the bottom and each additional conveyor module is arranged along a vertical axis above the conveyor module on the bottom, and
wherein, in the coplanar configuration, the conveying surface of each of the conveyor modules is sequentially aligned and continuous along a single plane, and
a stacking tool removably attached to the modular roller conveyor and operable to reposition the conveyor modules between the stacked configuration and the coplanar configuration.

10. The modular roller conveyor system of claim 9 wherein the stacking tool comprises a support base with an elevated platform, a main actuator, a bottom actuator, and a lift plate comprising a top segment and a bottom segment,
wherein the base, actuators, and lift plate are interconnected using a plurality of hinges,
wherein the lift plate slidably engages the pusher roller of each conveyor module,
wherein the actuators are operable to rotate the modular roller conveyor between the stacked configuration and the coplanar configuration,
wherein, when the main actuator is extended and the bottom actuator is retracted, the modular roller conveyor is positioned in the stacked configuration, and when the main actuator is retracted and the bottom actuator is extended, the modular roller conveyor is positioned in the coplanar configuration.

11. The modular roller conveyor system of claim 9 wherein the conveying surface is selected from the group comprising: gravity rollers, powered rollers, a flat belt conveyor, a magnetic belt conveyor, and wheel conveyors.

12. The modular roller conveyor system of claim 9 comprising a separator at the entry end and the exit end of the conveyor modules, wherein each separator is operable to be in a first open position or a second closed position.

13. The modular roller conveyor system of claim 9 comprising a plurality of wheels connected to a bottom surface of the bottom roller conveyor module.

14. The modular roller conveyor system of claim 9 comprising a plurality of modular roller conveyors, wherein the stacking tool is removably attached to each modular roller conveyor and operable to reposition each conveyor module between the stacked configuration and the coplanar configuration.

15. A modular roller conveyor comprising:
at least three conveyor modules connected by a plurality of links, each conveyor module comprising an entry end and an exit end, opposing side rails, and a conveying surface coupled to the side rails and operable to transport items from the entry end to the exit end,
wherein the links are rotatably connected to the side rails of the conveyor modules and operable to transition the conveyor modules between a stacked configuration and a coplanar configuration while keeping the conveying surface of each conveyor module in a parallel relationship with the conveying surface of the conveyor module on the bottom,
wherein, in the stacked configuration, one of the conveyor modules is positioned on the bottom and each additional conveyor module is arranged along a vertical axis above the conveyor module on the bottom, and
wherein, in the coplanar configuration, the conveying surface of each of the conveyor modules is sequentially aligned and continuous along a single plane.

16. The modular roller conveyor or claim 15 wherein each of the conveyor modules between the conveyor module on the bottom and the conveyor module on the top has three attachment points at each side rail to which the links are rotatably attached: a first attachment point at the exit end, a second attachment point at the entrance end, and a third attachment point between the first and second attachment points, wherein one end of the link attached to the third attachment point of one of the conveyor modules is attached to the first attachment point of an adjacent one of the conveyor modules and the other end of the link is attached to the second attachment point of the other adjacent one of the conveyor modules.

17. The modular roller conveyor of claim 15 wherein the conveying surface is selected from the group comprising: gravity rollers, powered rollers, a flat belt conveyor, a magnetic belt conveyor, and wheel conveyors.

18. The modular roller conveyor of claim 15 comprising a separator at the entry end and the exit end of the conveyor modules, wherein each separator is operable to be in a first open position or a second closed position.

19. The modular roller conveyor of claim 15 comprising a plurality of wheels connected to a bottom surface of the bottom conveyor module.

20. The modular roller conveyor of claim 15 wherein the side rails each have a height that extends a distance above the conveying surface.

* * * * *